(12) United States Patent
Kamei et al.

(10) Patent No.: US 7,721,619 B2
(45) Date of Patent: May 25, 2010

(54) VEHICULAR SHIFT LOCK DEVICE

(75) Inventors: Yoshifumi Kamei, Okazaki (JP); Etsuo Shimizu, Toyota (JP); Takayoshi Masuda, Toyota (JP); Yoshiyuki Shindo, Niwa-gun (JP); Yasunori Takeuchi, Chita-gun (JP); Shinichi Uemura, Nagoya (JP)

(73) Assignees: Toyota Jidosha Kabushiki Kaisha, Toyota-shi (JP); Mannoh Kogyo Co., Ltd., Anjo-shi (JP); Kabushiki Kaisha Tokai-Rika-Denki-Seisakusho, Niwa-gun (JP); Tsuda Industries Co., Ltd., Kariya (JP); Kojima Press Industry Co., Ltd., Toyota-shi (JP)

( * ) Notice: Subject to any disclaimer, the term of this patent is extended or adjusted under 35 U.S.C. 154(b) by 1027 days.

(21) Appl. No.: 11/445,173

(22) Filed: Jun. 2, 2006

(65) Prior Publication Data

US 2006/0272441 A1   Dec. 7, 2006

(30) Foreign Application Priority Data

Jun. 3, 2005   (JP)   ............................. 2005-164800

(51) Int. Cl.
*G05G 5/00* (2006.01)
(52) U.S. Cl. .................................................. 74/473.23

(58) Field of Classification Search ................ 74/473.1, 74/473.21, 473.23, 473.24, 473.25, 473.26, 74/473.3, 519, 523
See application file for complete search history.

(56) References Cited

U.S. PATENT DOCUMENTS 5,379,872 A * 1/1995 Dorr et al. ................ 192/220.4
5,797,295 A * 8/1998 Kataumi et al. ........... 74/483 R
6,684,730 B2 * 2/2004 Giefer et al. .............. 74/473.23

FOREIGN PATENT DOCUMENTS

JP           7-41134         7/1995

* cited by examiner

*Primary Examiner*—Vicky A Johnson
(74) *Attorney, Agent, or Firm*—Oblon, Spivak, McClelland, Maier & Neustadt, L.L.P.

(57) ABSTRACT

A vehicular shift lock device including (a) a shift lock member movable between a locking position which is located on a predetermined path of movement of a shift lever from one operating position to another operating position and in which the shift lock member inhibits the movement of the shift lever, and an unlocking position which is spaced from the locking position and in which the shift lock member permits the movement of the shift lever, and (b) a guide member which guides the shift lever so as to move along the predetermined path of movement, wherein the guide member defines the locking position of the shift lock member when the shift lock member is moved in a direction intersecting the predetermined path of movement of said shift lever.

11 Claims, 7 Drawing Sheets

VEHICULAR SHIFT LOCK DEVICE

BACKGROUND OF THE INVENTION

1. Field of the Invention

The present invention relates in general to a vehicular shift lock device, and more particularly to a vehicular shift lock device which is compact in construction and economical to manufacture and which assures a high degree of stability of its locking function.

2. Discussion of Related Art

There is known a vehicular shift lock device comprising a shift lock member movable between a locking position which is located on a predetermined path of movement of a shift lever from one operating position to another operating position and in which the shift lock member inhibits the above-indicated movement of the shift lever, and an unlocking position which is spaced from the locking position and in which the shift lock member permits the above-indicated movement of the shift lever. JP-7-41134 U discloses an example of such a shift lock device, which is arranged to selectively inhibit or permit a movement of the shift lever from a parking position to a reverse-drive position or from a neutral position to the reverse-drive position, depending upon a running condition of the vehicle, for example, whether a vehicular braking system is in operation or not, or depending upon a selected position of a key provided on the vehicle, or a running speed of the vehicle.

In the known shift lock device as described above, a stopper member is disposed on a base member by which the shift lever is supported. The stopper member holds the shift lock member in its locking position located on the path of movement of the shift lever and in which the shift lock member is held in abutting contact with the shift lever, to inhibit the movement of the shift lever. In the locking position defined by the stopper member disposed on the base member, the position at which the shift lock member comes into abutting contact with the shift lever tends to vary. Described in detail, the path of movement of the shift lever is generally defined by a guide slot formed through a guide member fixed to the base member, so that a position of abutting contact between the shift lever guided by the guide slot and the shift lock member placed in the locking position defined by the stopper member disposed on the base member may vary due to a positioning error of the guide member relative to the base member. This problem may be solved by enlarging an abutting portion of the shift lock member so that the shift lever is locked with high stability by the abutting contact of the shift lever with the abutting portion of a relatively large size. Alternatively, the problem may be solved by positioning the guide member with high accuracy relative to the base member. These solutions lead to an increased size and/or an increase cost of manufacture of the shift lock device.

SUMMARY OF THE INVENTION

The present invention was made in view of the background art described above. It is therefore an object of this invention to provide a vehicular shift lock device which is compact in construction and economical to manufacture and which assures a high degree of stability of its locking function.

The object indicated above may be achieved according to the principle of the present invention, which provides a vehicular shift lock device comprising (a) a shift lock member movable between a locking position which is located on a predetermined path of movement of a shift lever from one operating position to another operating position and in which the shift lock member inhibits the movement of the shift lever, and an unlocking position which is spaced from the locking position and in which the shift lock member permits the movement of the shift lever. and (b) a guide member which guides the shift lever so as to move along the predetermined path of movement, wherein the guide member defines the locking position of the shift lock member when the shift lock member is moved in a direction intersecting the predetermined path of movement of the shift lever.

In the vehicular shift lock device of the present invention constructed as described above, the guide member defining the predetermined path of movement of the shift lever defines the locking position of the shift lock member when the shift lock member is moved in the direction intersecting the predetermined path of movement of the shift lever. Accordingly, the position of abutting contact between the shift lever guided by the guide member and the shift lock member placed in the locking position defined by the guide member is less likely to vary due to a positioning error of the guide member. Thus, the shift lock member can be small-sized and made compact in construction and assures a high degree of its locking function, and is economical to manufacture in the absence of a need for high accuracy of positioning of the guide member.

In one preferred form of the present invention, the shift lock member is disposed pivotably about an axis of a support shaft, and includes an abutting portion which is movable in the direction intersecting the predetermined path of movement of the shift lever, for abutting contact with the shift lever to inhibit the movement of the shift lever when the shift lock member is placed in the locking position, the shift lock member and the guide member being constructed such that a load ($f_{1a}$) acts on the shift lock member in one of opposite directions of extension of a straight line passing the abutting portion and the axis of said support shaft, as a result of an abutting contact of the shift lever with the abutting portion while the shift lock member is placed in the locking position. Further, the shift lock member placed in the locking position is held in pressing contact with the guide member at a position lying on or close to the straight line, and at least one of mutually contacting surfaces of the shift lock member and the guide member is inclined with respect to a straight line normal to a circular arc which having a center on the axis of said support shaft, whereby a load ($f_{3a}$) acts on the shift lock member in the other of the opposite directions of extension of the straight line as a result of said pressing contact.

In the shift lock device according to the preferred form of the invention described above, the load ($f_{3a}$) produced as a result of the pressing contact of the shift lock member with the guide member acts on the shift lock member in the direction parallel to the above-described straight line, which is opposite to the direction in which the load ($f_{1a}$) produced as a result of the abutting contact of the shift lever with the abutting portion of the shift lock member acts on the shift lock member. Accordingly, the load acting between the shift lock member and the support shaft is reduced by an amount equal to the load produced by the pressing contact of the shift lock member with the guide member, so that the shift lock member can be further small-sized and made more compact in construction and is more economical to manufacture.

Preferably the shift lock member placed in the locking position and the guide member are held in pressing contact with each other at the position lying on the reference straight line which passes the abutting portion of the shift lock member and the axis of the support shaft. However, the position of the pressing contact of the shift lock member and the guide member may be located within an area defined by two boundary straight lines which pass the axis of the support shaft and which are inclined with respect to the above-indicated reference straight line passing also the abutting portion, by a maximum angle of about 10° on the respective opposite sides of the reference straight line. In this maximum angular area of about 20°, the shift lock device provides substantially the same advantages as described above with respect to the preferred form of the invention described above. However, the position of the pressing contact of the shift lock member and the guide member according to the principle of this invention may be located within a maximum angular area of about 40° defined by two boundary straight lines inclined with respect to the reference straight line by a maximum angle of about 20° on the respective opposite sides of the reference straight line. The "position close to the straight line" described above is interpreted to mean the position within the angular area of about 40°.

The shift lock device of the present invention may be disposed at the position of a center console located adjacent to an operator's seat of the vehicle, for example. However, the vehicular shift lock device may be disposed in an instrumental panel or steering column of the vehicle.

For example, the shift lever is supported by a shift shaft extending in the transverse or width direction of the vehicle such that the shift lever is pivotable about the shift shaft in the longitudinal or running direction of the vehicle, or in the vertical direction. In this case, the shift lever is further supported by a select shaft extending perpendicularly to the shift shaft such that the shift lever is pivotable about the select shaft in the transverse direction of the vehicle. However, the shift lever may be supported by a ball joint or any other device which permits movements of the shift lever to a plurality of operating positions.

The operating positions of the shift lever may include: a parking position in which an output shaft of a transmission is locked by a suitable parking lock mechanism; a neutral position in which power is not transmitted through the transmission; a reverse-drive position for reverse driving of the vehicle; and a forward-drive position for forward driving of the vehicle. The shift lock member is selectively placed in its locking position or unlocking position, to inhibit or permit a movement of the shift lever from the parking position to another operating position, depending upon a running condition of the vehicle, for instance, depending upon whether a vehicular braking system is in operation or depending upon a presently selected position of a key provided on the vehicle. The shift lock member may inhibit a movement of the shift lever from a position other than the parking position. Further, the shift lock member may be placed in the locking or unlocking position depending upon any other running condition of the vehicle, such as the running speed.

The guide member may have a guide slot defining the predetermined path of movement of the shift lever, so that the shift lever is guided by the guide slot, and may be provided with means for holding the shift lever in the parking position or any other selected operating position. The guide slot may be formed to hold the shift lever in the parking position, for example, by abutting contact of the shift lever with an end face of the guide slot. Alternatively, the guide member may be provided with a toothed or serrated surface having a plurality of teeth defining a plurality of recessed portions corresponding to the respective operating positions of the shift lever. In this case, the shift lever is provided with a detect member which is biased by a spring or any other biasing means and brought into pressing engagement with one of the recessed portions of the serrated surface of the guide member, so that the shift lever is held in the selected operating position. Alternatively, the shift lever has a plurality of teeth while the guide member is provided with a detect member for selective engagement with one of the teeth of the shift lever.

In the preferred form of the shift lock device described above, the shift lock member is pivotally supported by the support shaft, which may be supported by a base member by which the shift lever is pivotally supported. However, the shift lock member may be linearly movable between its locking and unlocking positions. The shift lock member may be directly supported by the guide member such that the shift lock member is movable between the locking and unlocking positions.

Preferably, the shift lock member is a lock lever which is disposed pivotably about the axis of the support shaft extending in a substantially horizontal direction substantially parallel to the transverse direction of the vehicle and which extends in a substantially vertical direction. The lock lever has an upper end portion provided with an engaging jaw which is brought into engagement with an engaging portion of the guide member when the lock lever is pivoted into its locking position, so as to move the upper end portion in the rearward direction of the vehicle. In this case, the shift lever is disposed pivotably about a select shaft perpendicular to the support shaft of the lock lever, so that the shift lever comes into abutting contact with the abutting portion of the lock lever when the shift lever is pivoted in the transverse direction of the vehicle. Preferably, a load acting on the lock lever in the transverse direction of the vehicle upon abutting contact of the shift lever with the abutting portion is received by the base member. The position of abutting contact between the shift lever and the abutting portion of the lock lever, the configuration of the abutting surface of the abutting portion, and the positional relationship among the various components of the shift lock device are preferably determined such that a moment acting on the lock lever upon abutting contact of the shift lever with the abutting portion, so as to pivot the lock lever about the axis of the support shaft, tends to force the engaging jaw onto the engaging portion of the guide member, to prevent the lock lever from pivoting away from the locking position.

Where the shift lock member is disposed pivotably about the axis of the support shaft as in the preferred form of the vehicular shift lock device described above, the shift lever may be arranged to come into abutting contact with the shift lock member in a direction perpendicular to a plane of pivoting of the shift lock member about the axis of the support shaft, such that a load acting on the shift lock member upon abutting contact of the shift lever with the shift lock member is received by a base member by which the shift lever is pivotably supported. In this case, the load acting on the support shaft upon the abutting contact of the shift lever with the shift lock member is almost zeroed. However, this arrangement reduces a freedom of design of the relative positioning and configuration of the components of the shift lock device, and may cause generation of various loads acting in different directions due to assembling and positioning errors of the shift lock device. In view of this drawback, the position of the abutting contact between the shift lever and the abutting portion of the lock lever and the positional relationship among the various components of the shift lock device are determined in the above-described preferred form of the shift lock device, such that the shift lock member is subject to a load acting in a predetermined direction when the shift lock member is placed in its locking position, and such that the shift lock member and the guide member are held in pressing contact with each other, so that the load produced upon the abutting contact of the shift lever with the abutting portion of the shift lock member and the load produced as a result of the pressing contact of the shift lock member with the guide member act in the respective opposite directions of extension of the above-described straight line which pass the abutting portion and the axis of the support shaft.

The shift lock member is preferably arranged to be movable in a direction substantially perpendicular to the path of movement of the shift lever. However, the direction of movement of the shift lock member need not be perpendicular to the path or direction of movement of the shift lever. Namely, the shift lock member may be arranged to be movable in a direction which is inclined with respect to the path of movement of the shift lever by a suitable angle

BRIEF DESCRIPTION OF THE DRAWING

The foregoing and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENT

Figure 1:
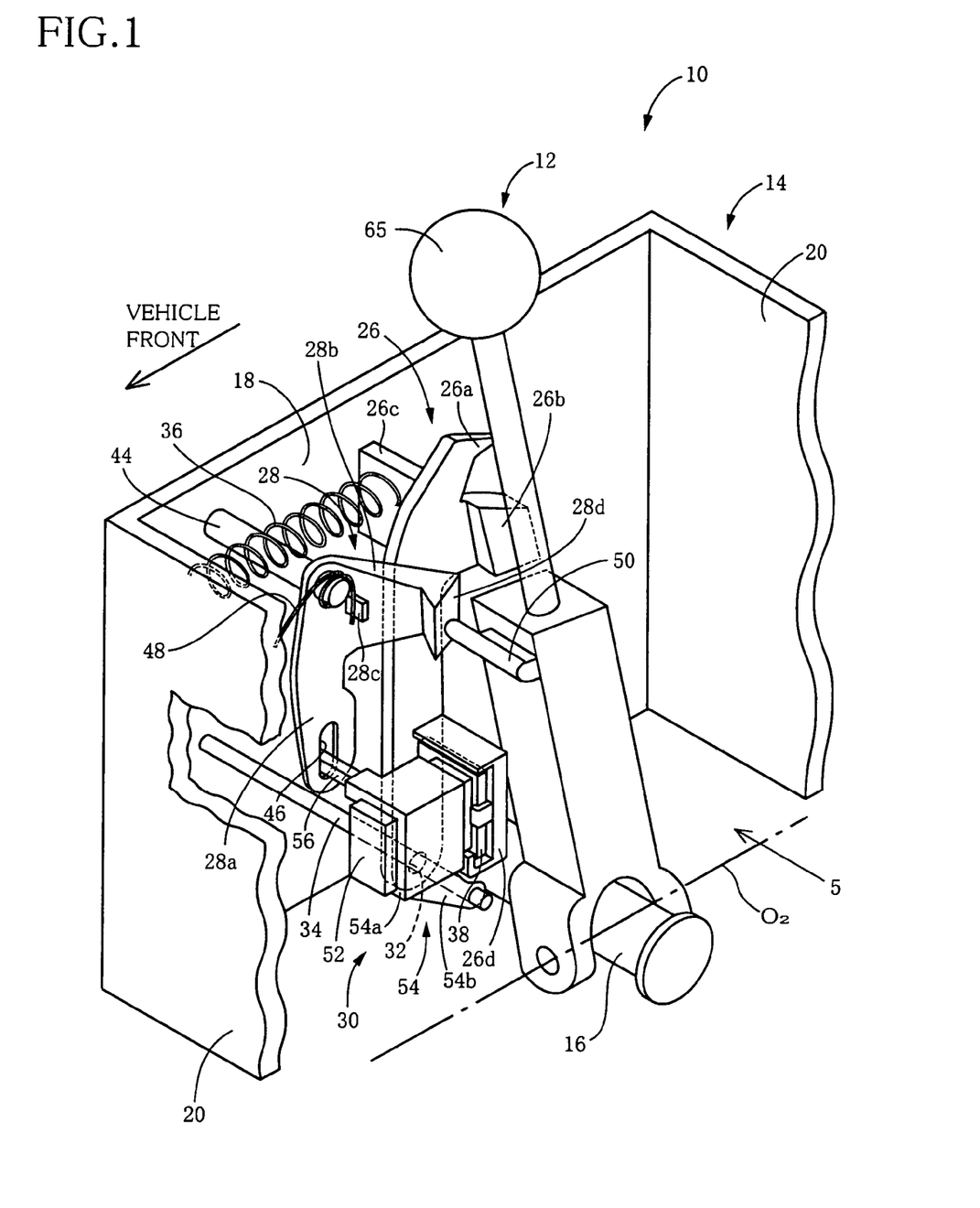
FIG. 1 is a perspective view schematically showing an arrangement of a vehicular shift lock device constructed according to one preferred embodiment of this invention.
Figure 2:
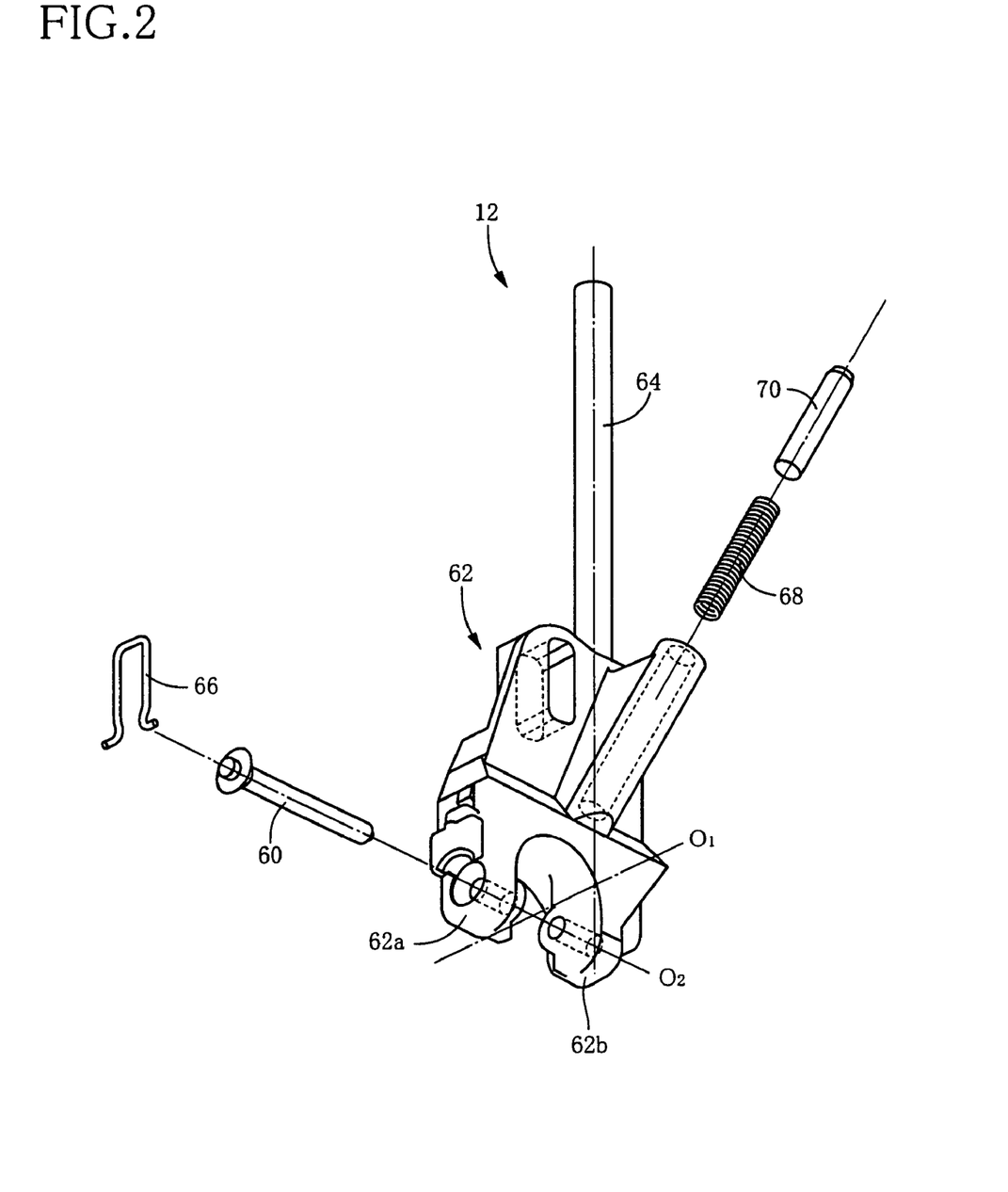
FIG. 2 is an exploded fragmentary perspective view of a shift lever of the vehicular shift lock device of FIG. 1.

Referring first to the perspective view of FIG. 1, there is schematically shown the arrangement of a vehicular shift lock device 10 constructed according to one preferred embodiment of this invention. The vehicular shift lock device 10 includes a shift lever 12 a part of which is shown in the exploded fragmentary perspective view of FIG. 2, and is disposed at a position of a center console located adjacent to an operator's seat of a vehicle. The vehicular shift lock device 10 is supported by a base member 14 fixed to a floor of the vehicle, for example, and includes a shift shaft 16 supported by the base member 14 such that the shift shaft 16 is rotatable about a first axis $O_1$ (indicated in FIG. 2) which extends in a horizontal direction parallel to the transverse or width direction of the vehicle. The vehicular shift lock device 10 further includes a select shaft 60 which extends through the shift shaft 16 and a lower portion of the shift lever 12 and which has a second axis $O_2$ extending in a horizontal direction perpendicular to the first axis $O_1$ and parallel to the longitudinal or running direction of the vehicle, as shown in FIG. 2. The shift lever 12 is supported by the shift shaft 16 and the select shaft 60 such that the shift lever 12 is pivotable about the first axis $O_1$ and accordingly movable in the longitudinal direction of the vehicle, and is also pivotable about the second axis $O_2$ and accordingly movable in the transverse direction of the vehicle. The base member 14 has a rectangular box-like structure including a pair of longitudinal walls 18 (only one of them being shown in FIG. 1) parallel to the longitudinal direction of the vehicle, and a pair of transverse walls 20 parallel to the transverse direction of the vehicle. The shift shaft 16 is supported by the pair of longitudinal walls 18, so as to be rotatable about the first axis $O_1$.

Referring to FIG. 2, the shift lever 12 includes a lever-mounting member 62 through which the select shaft 60 extends, and a rod 64 which is fixed to the lever-mounting member 62 and which is formed of a ferrous material. The lever-mounting member 62 includes a bifurcated part having a pair of leg portions 62a, 62b located on the diametrically opposite sides of the shift shaft 16. The select shaft 60 extends through the pair of leg portions 62a, 62b and the shift shaft 16 such that the second axis $O_2$ of the select shaft 60 is perpendicular to the first axis $O_1$ of the shift shaft 16. Thus, the shift lever 12 is supported by the shift shaft 16 via the select shaft 60. The select shaft 60 is retained in place relative to the lever-mounting portion 62, by a retainer 66 in the form of a clip which is fixed to the leg portion 62a and held in engagement with the head portion of the select shaft 60, so that the removal of the select shaft 60 from the lever-mounting portion 62 and the shift shaft 16 is prevented. As shown in FIG. 1, the rod 64 has a knob 65 screwed or otherwise fastened to its upper end portion. The shift lever 12 is operated at its knob 65 by the vehicle operator.

Figure 3A:
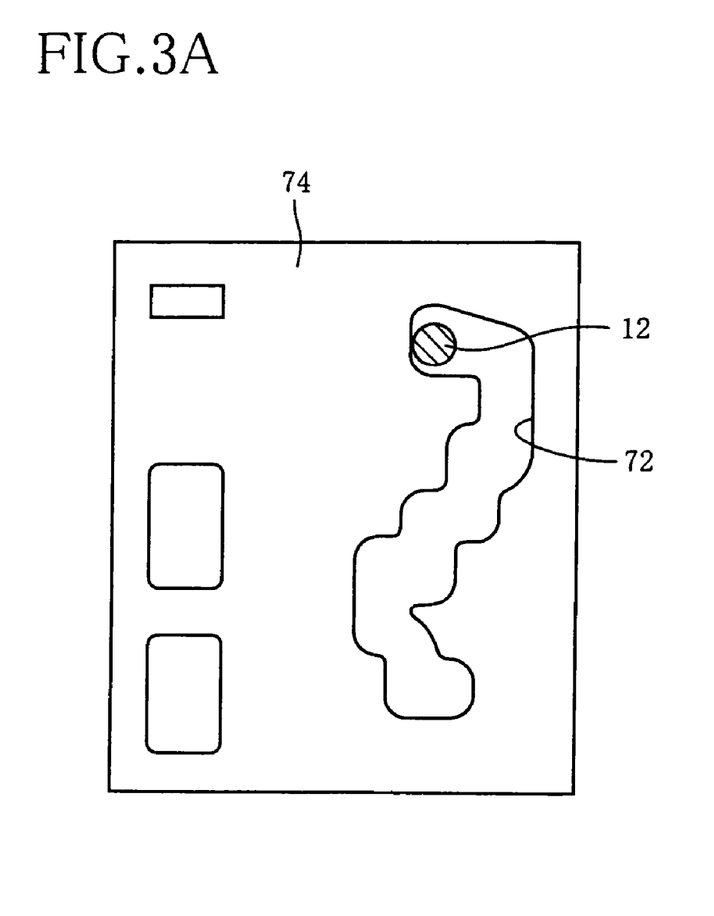
FIG. 3A is a plan view of a guide plate for guiding the shift lever of FIG. 2, showing.
Figure 3B:
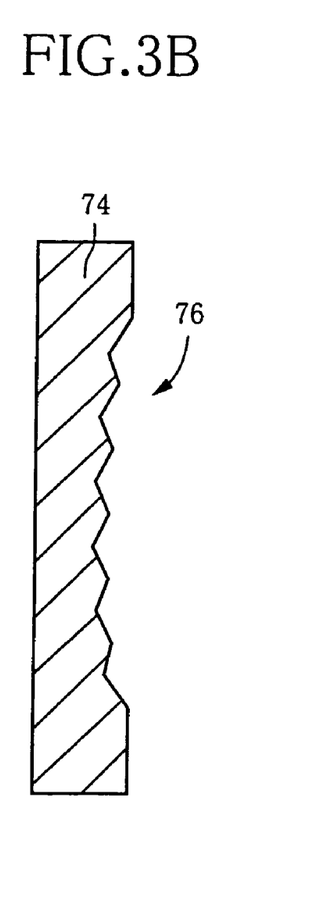
FIG. 3B is a vertical cross sectional view of the guide plate.
Figure 4:
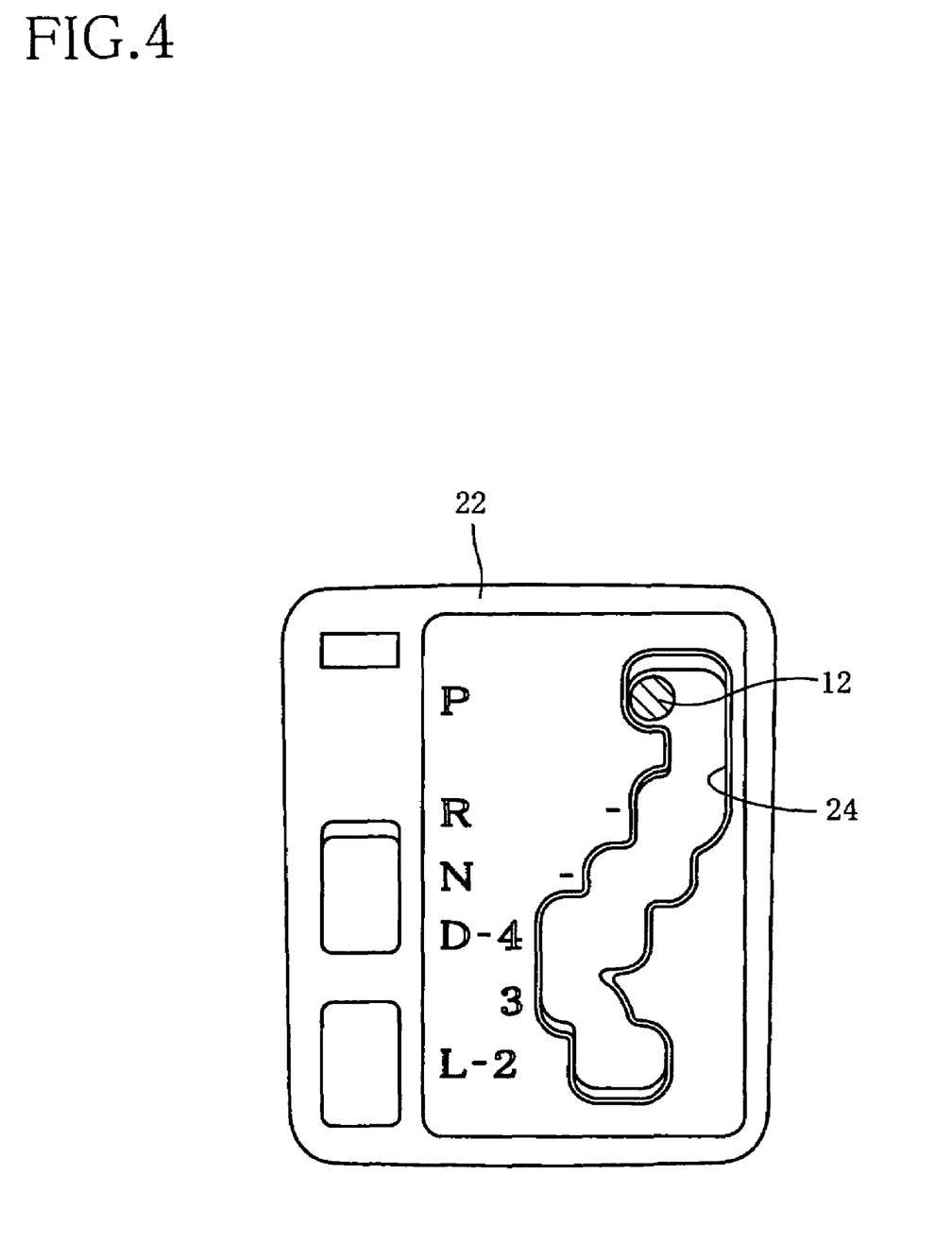
FIG. 4 is a plan view showing an indicia plate attached to the guide plate.

The box-like structure of the base member 14 is provided at its upper end with a guide plate 74 having a guide slot 72 which defines a path of pivotal movement of the shift lever 12, as shown in FIG. 3A. The shift lever 12 is guided at its rod 64 by the guide slot 72 formed through the guide plate 74. On the upper surface of the guide plate 74, there is fixed an indicia plate 22 having indicia indicative of operating positions: PARKING position P; REVERSE position R; NEUTRAL position N; DRIVE position D, etc., as shown in FIG. 4. The indicia plate 22 has a cutout 24 substantially identical in shape with the guide slot 72, and the rod 64 extends through the cutout 24 as well as the guide slot 72, so that shift lever 12 is operable to a selected one of the operating positions P, R, N, D, etc. The shift lever 12 is pivotally moved to the selected operating position along the guide slot 62, by movements of the shift lever 12 in the select direction parallel to the transverse direction of the vehicle, and movements of the shift lever 12 in the shift direction parallel to the longitudinal direction of the vehicle. A movement of the shift lever 12 in the shift direction causes a movement of a spool of a manual valve of an automatic transmission of the vehicle mechanically connected to the shift lever 12 through a cable or link, so that a hydraulic circuit is switched to place the automatic transmission in a selected one of its operating states: a parking state in which an output shaft of the automatic transmission is locked to inhibit its rotary motion; a reverse-drive state for reverse running of the vehicle; a neutral state in which power is not transmitted through the automatic transmission; a forward-drive state in which the automatic transmission is placed in a selected one of a plurality of forward-drive gear positions. As shown in FIG. 2, the lever-mounting portion 62 of the shift lever 12 is provided with a detent pin 70 biased by a detent spring 68 in the form of a compression coil spring in a direction away from the lever-mounting portion. On the other hand, the guide plate 74 has a serrated inner surface 76 having a plurality of teeth defining a plurality of recessed portions corresponding to the respective operating positions P, R, N, D, etc. of the shift lever 12, as shown in FIG. 3B. The recessed portions are spaced apart from each other in the shift direction. The detent pin 70 is brought into pressing engagement with one of the recessed portions of the serrated inner surface 76, so that the shift lever 12 is held in the selected operating position within the above-indicated amount of play in the shift direction. It is noted that the guide plate 74 functions as a guide member, and that FIG. 3A is a plan view of the guide plate 74 while FIG. 3B is a vertical cross sectional view of the guide plate 74.

The shift lever 12 guided by the guide slot 72 is of a gate type arranged to prevent an erroneous operation owing to a path of movement defined by the shape of the guide slot 72. When the shift lever 12 is moved from the PARKING position P to any other operating position, the shift lever 12 is first pivoted rightwards toward the right longitudinal wall 18 (shown in FIG. 1), about the second axis $O_2$. To permit and inhibit this rightward pivotal movement of the shift lever 12 from the PARKING position P, the shift lock device 10 is provided with a shift lock member in the form of a lock lever 26, a cam link 28, and a solenoid link 30.

Figure 5A:
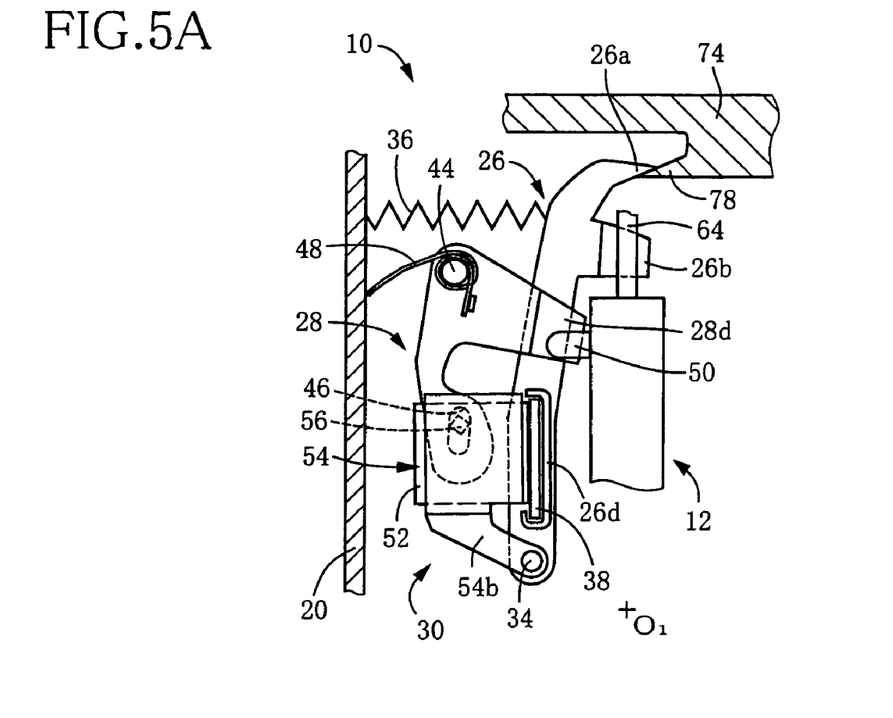
FIG. 5A is an elevational view partly in cross section taken in a direction of arrow 5 indicated in FIG. 1.

The lock lever 26 is a generally elongate planar member supported by a first support shaft 34 extending through a through-hole 32 formed in a lower portion thereof, such that the lock lever 26 is rotatable or pivotable about the axis of the first support shaft 34. The first support shaft 34 is supported by the pair of longitudinal walls 18 such that the first support shaft 34 extends in parallel with the shift shaft 16 and is located in front of the shift shaft 16 as seen in the longitudinal direction of the vehicle. The lock lever 26 is pivotable about the first support shaft 34, such that an upper end portion of the lock lever 26 is movable in the longitudinal direction of the vehicle. The lock lever 26 includes an engaging jaw 26a integrally formed at its upper end so as to project in the rearward direction of the vehicle. The lock lever 26 is held in its locking position (which will be described), with its engaging jaw 26a held in abutting contact with an engaging portion 78 formed on the underside of the guide plate 74, as shown in FIG. 5A. In other words, the locking position of the lock lever 26 is defined by the engaging portion 78 of a guide member in the form of the guide plate 74, more precisely, by the engagement of the engaging jaw 26a with the engaging portion 78 of the guide member 74. The lock lever 26 further includes an abutting portion 26b having a larger thickness that the other portion. The abutting portion 26b is formed slightly below the engaging jaw 26a, so as to extend in the rearward direction of the vehicle, like the engaging jaw 26a. When the lock lever 26 is placed in the locking position, the abutting portion 26b is located on the left side of and adjacent to the rod 64 of the shift lever 12 placed in the PARKING position P, so that the rod 64 is brought into abutting contact with the abutting portion 26b during an initial rightward movement of the rod 64 when the shift lever 12 is moved rightwards from the PARKING position P, whereby the rightward movement of the shift lever 12 from the PARKING position P is inhibited by the abutting portion 26b. In the present embodiment, the pivotal movement of the lock lever 26 causes a movement of the abutting portion 26b in the longitudinal direction of the vehicle (shift direction) perpendicular to the transverse direction of the vehicle (select direction) in which the shift lever 12 is moved from the PARKING position P.

Figure 5B:
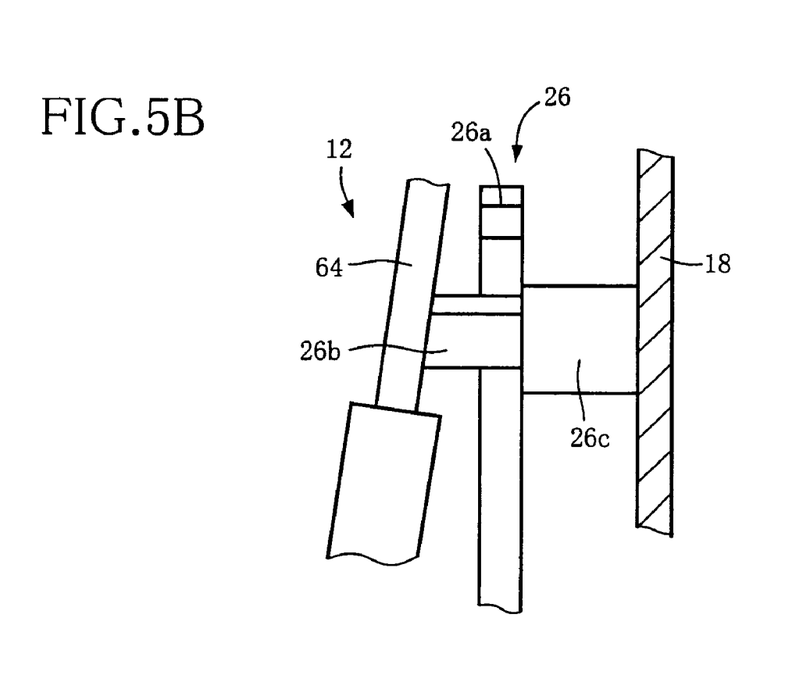
FIG. 5B is an elevational view partly in cross section taken from the right side of FIG. 5A when the shift lever is placed in its locking position.
Figure 7:
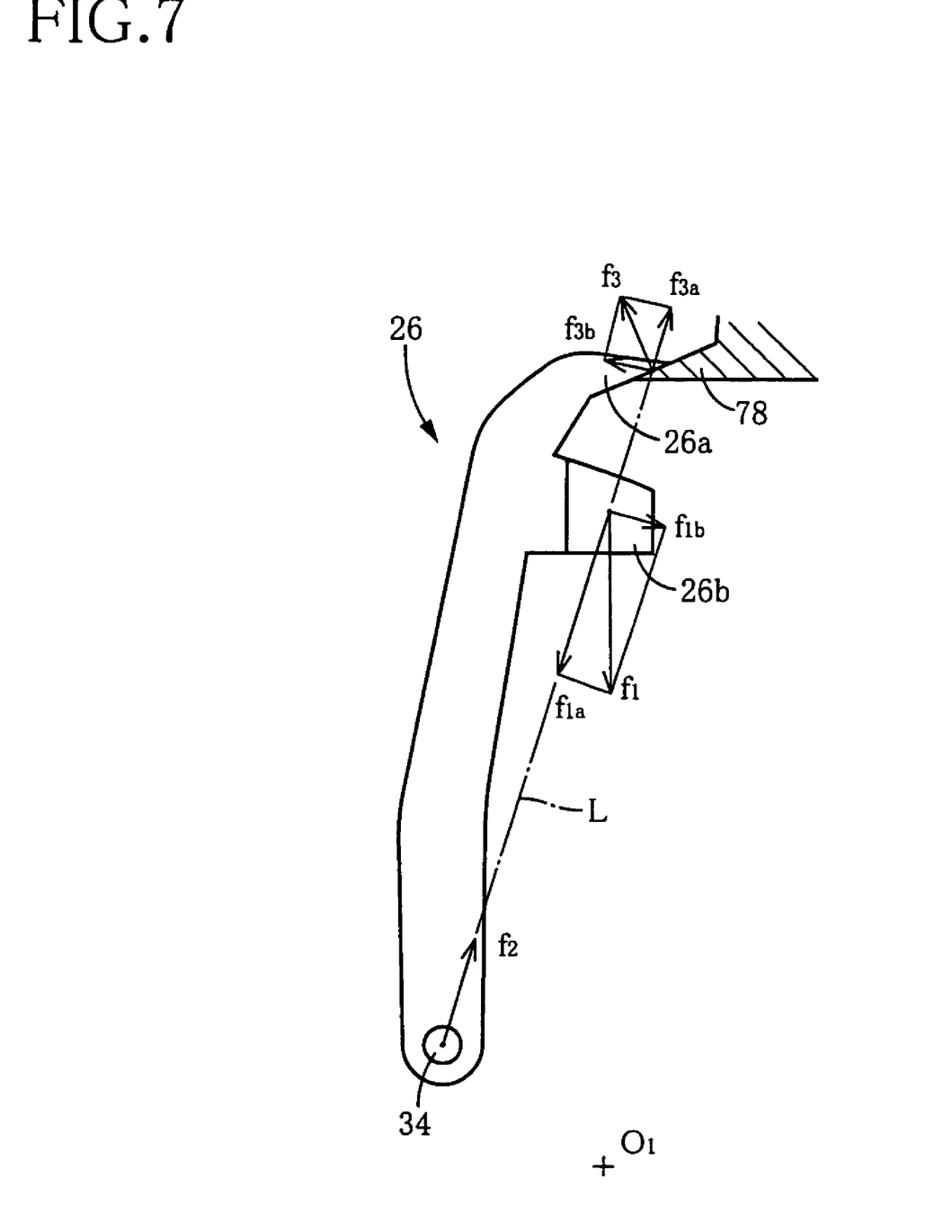
FIG. 7 is a view for explaining various forces acting on the shift lever when the shift lever is locked by a lock lever in the shift lock device of FIG. 1.

Reference is then made to FIG. 5A which is an elevational view partly in cross section taken in a direction of arrow 5 indicated in FIG. 1, and FIG. 5B which is an elevational view partly in cross section taken from the right side of FIG. 5A, namely, in the forward direction of the vehicle, when the shift lever is placed in its locking position. As shown in FIG. 1 and FIG. 5B, the lock lever 26 further includes a support plate portion 26c formed integrally so as to extend rightwards toward the right longitudinal wall 18, away from the shift lever 12, so that the support plate portion 26c is in sliding contact with the inner surface of the right longitudinal wall 18, whereby a substantive portion of a force exerted from the shift lever 12 onto the lock lever 26 is received by the right longitudinal wall 18 via the support plate portion 26c, when the shift lever 12 is brought into abutting contact with the abutting portion 26b of the lock lever 26 placed in its locking position. When the shift lever 12 is in abutting contact with the abutting surface of the abutting portion 26b, the rod 64 is inclined rightwards from the vertical plane, so that a load fi acts on the lock lever 26 in a downward direction toward the first axis $O_1$ of the shift shaft 16, as shown in FIG. 7. The load $f_1$ includes a component f1b acting as a moment which tends to cause a clockwise pivotal motion (as seen in FIG. 7) of the lock lever 26 about the first support axis 34. In the presence of this component f1b, the engaging jaw 26a of the lock lever 26 is forced onto the engaging portion 78 of the guide plate 74, so that the lock lever 26 is held with high stability in its locking position, so as to assure a high degree of stability of its locking function. In view of the inclination of the rod 64 upon abutting contact with the abutting portion 26b, the abutting surface of the abutting portion 26b is inclined from the vertical plane, by an angle substantially equal to the angle of rightward inclination of the rod 64 upon abutting contact with the abutting portion 26b.

The other component $f_{1a}$ of the load $f_1$ acts in the direction toward the axis of the first support shaft 34. The engaging portion 78 and the engaging jaw 26a are arranged such that a point of engagement of the engaging jaw 26a with the engaging portion 78 lies on a straight line L passing the axis of the first support shaft 34 and the abutting portion 26b. The engaging jaw 26a and the engaging portion 78 have mutually contacting surfaces which are parallel to each other and which are inclined with respect to a straight line normal to a circular arc having a center on the axis of the first support shaft 34. This straight line normal to the circular arc is a part of the straight line L described above. Described more specifically, the mutually contacting parallel surfaces of the engaging jaw 26a and engaging portion 78 are inclined such that the mutually contacting surfaces extend in the rearward direction of the vehicle (in the rightward direction as seen in FIG. 7) as these surfaces extend in the radially outward direction of the above-indicated circular arc. In this arrangement, a reaction force $f_3$ is produced as a result of the pressing contact of the inclined contacting surface of the engaging jaw 26a with the inclined contacting surface of the engaging portion 78 in the presence of the component fib of the load $f_1$ described above. The reaction force $f_3$ includes a component $f_{3a}$ acting in the radially outward direction of the above-indicated circular arc the center of which lies on the axis of the first support shaft 34. Accordingly, a load $f_2$ acting on the first support shaft 34 is equal to the component $f_{1a}$ minus the component $f_{3a}$, so that the load acting between the lock lever 26 and the first support shaft 34 is reduced.

Referring back to FIG. 1, the shift lock device 10 includes a return spring 36 in the form of a compression coil spring one end of which is fixed to the support plate portion 26c and the other end of which is fixed to the front transverse wall 20. Normally, the lock lever 26 is held in its locking position under a biasing action of the return spring 36 biasing the upper end portion of the lock lever 26 in the rearward direction of the vehicle. The lock lever 26 further includes a bracket portion 26*d* fixed to the lower end portion such that the bracket portion 26*d* extends substantially in parallel with the longitudinal direction of the lock lever 26. The bracket portion 26*d* holds a yoke 38 formed of a ferrous material.

The cam link 28 includes a vertical portion 28*a* extending in the vertical direction, and a horizontal portion 28*b* which extends from an upper end part of the vertical portion 28*a* in the horizontal direction toward the rear transverse wall 20. The horizontal portion 28*b* has a thickness that increases as it extends toward the rear transversal wall 20. A second support shaft 44 supported by the right longitudinal wall 18 extends through the upper end part of the vertical portion 28*a* in the transverse direction of the vehicle. The cam link 28 is pivotable about the second support shaft 44. The vertical portion 28*a* has an elongate hole 46 formed therethrough so as to extend in the vertical direction. The solenoid link 30 carries a pin 56 extending through the elongate hole 46. The vertical portion 28*a* further has a protruding portion 28*c* formed at its upper end part. A torsion coil spring 48 is wound on the second support shaft 44 at a position near the cam link 28. The torsion coil spring 48 is held at one of its opposite ends in engagement with the protruding portion 28*c* and at the other end with the inner surface of the front transversal wall 20. The cam link 28 is biased by the torsion coil spring 48 in a counterclockwise direction as seen in FIG. 1, and is normally held in its original position of FIG. 1 under a biasing action of the torsion coil spring 48. In this original position, the lower end of the vertical portion 28*a* is located at its rearmost position. 8 The horizontal portion 28*b* has a cam surface 28*d* formed on its distal end remote from the vertical portion 28*a*. The cam surface 28*d* is inclined such that a distance between the cam surface 28*d* and the shift lever 12 in the transversal direction of the vehicle increases as the cam surface 28*d* extends toward the rear transversal wall 20 in the longitudinal direction of the vehicle, that is, such that the distance between the cam surface 28*d* and the right longitudinal wall 18 decreases as the cam surface 28*d* extends toward the front transversal wall 20. The shift lever 12 is provided with a pusher pin 50 which comes into abutting contact with the inclined cam surface 28*d* when the shift lever 12 is pivoted about the second axis $O_2$ from its PARKING position P toward the lock lever 26 and cam link 28. The pusher pin 50 is positioned relative to the cam link 28 placed in the original position of FIG. 1 such that the pusher pin 50 initially contacts an area of the cam surface 28*d* which is lower than the axis of the second support shaft 44. When the pusher pin 50 is brought into abutting contact with the cam surface 28*d* during the pivotal movement of the shift lever 12 toward the right longitudinal wall 18, the cam link 28 is pivoted about the second support shaft 44 in a clockwise direction from the original position of FIG. 1 to an operated position against the biasing force of the torsion coil spring 48, as described below in detail by reference to FIG. 3B. The clockwise pivotal movement of the cam link 28 causes the lower end of the vertical portion 27*a* to move toward the front transversal wall 20 to which the torsion coil spring 48 is fixed at its one end.

The horizontal portion 28*b* has a cam surface 28*d* formed on its distal end remote from the vertical portion 28*a*. The cam surface 28*d* is inclined such that a distance between the cam surface 28*d* and the shift lever 12 in the transversal direction of the vehicle increases as the cam surface 28*d* extends toward the rear transversal wall 20 in the longitudinal direction of the vehicle, that is, such that the distance between the cam surface 28*d* and the right longitudinal wall 18 decreases as the cam surface 28*d* extends toward the front transversal wall 20. The shift lever 12 is provided with a pusher pin 50 which comes into abutting contact with the inclined cam surface 28*d* when the shift lever 12 is pivoted about the second axis $O_2$ from its PARKING position P toward the lock lever 26 and cam link 28. The pusher pin 50 is positioned relative to the cam link 28 placed in the original position of FIG. 1 such that the pusher pin 50 initially contacts an area of the cam surface 28*d* which is lower than the axis of the second support shaft 44. When the pusher pin 50 is brought into abutting contact with the cam surface 28*d* during the pivotal movement of the shift lever 12 toward the right longitudinal wall 18, the cam link 28 is pivoted about the second support shaft 44 in a clockwise direction from the original position of FIG. 1 to an operated position against the biasing force of the torsion coil spring 48, as described below in detail by reference to FIG. 3B. The clockwise pivotal movement of the cam link 28 causes the lower end of the vertical portion 27*a* to move toward the front transversal wall 20 to which the torsion coil spring 48 is fixed at its one end.

The solenoid link 30 described above includes a solenoid 52 and a holder casing 54 holding the solenoid 52. The holder casing 54 includes a holder portion 54*a* of box construction, and a leg portion 54*b* extending from the lower wall of the holder portion 54*a*. The first support shaft 34 described above extends through the leg portion 54*b*, such that the solenoid link 30 as well as the lock lever 26 is pivotable about the first support shaft 34. The pin 56 described above extends from the holder portion 54*a* of the solenoid link 30, and is held in engagement with the elongate hole 46 formed in the cam link 28. In this arrangement, the solenoid link 30 is pivotable in the counterclockwise direction about the first support shaft 34 to its operated position when the cam link 28 is pivoted in the clockwise direction about the first support shaft 34 its operated position. The holder casing 54 holds the solenoid 52 such that an end portion of the solenoid 52 on the side of the yoke 38 extends from the holder portion 54*a* toward the yoke 38. When the solenoid 52 is energized, the yoke 38 is attracted to the solenoid 52, whereby the lock lever 26 having the yoke 38 is pivotable about the first support shaft 34 together with the solenoid link 30.

Referring to the elevational views of FIGS. 5A and 5B, there will be described an operation of the shift lock device 10. FIG. 5B shows an initial state of the shift lock device 10 when the shift lever 12 is placed in the PARKING position P with its pusher pin 50 spaced apart from the cam surface 28*d*, while the lock lever 26 is held in the locking position under the biasing action of the return spring 36, with its engaging jaw 26*a* held in engagement with the engaging portion 78. In this initial state, the solenoid link 30 and the cam link 28 operatively connected to the solenoid link 30 are held in their original position under the biasing action of the torsion coil spring 48, with the solenoid 52 held in contact with the yoke 38.

Figure 6A:
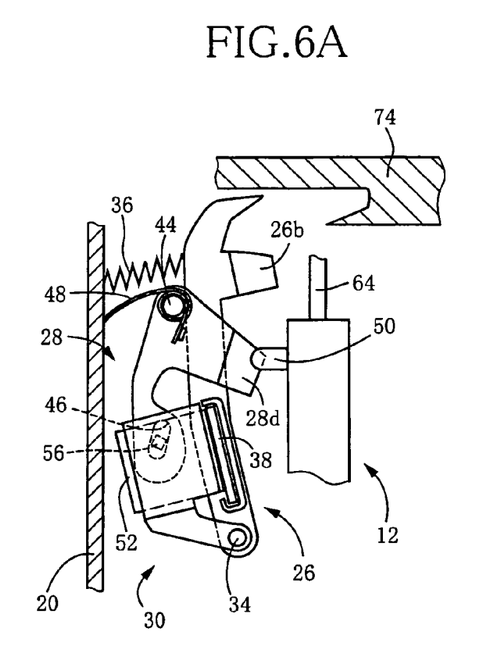
FIG. 6A is an elevational view partly in cross section for explaining an operation of the vehicular shift lock device when the shift lever is placed in its unlocked state.
Figure 6B:
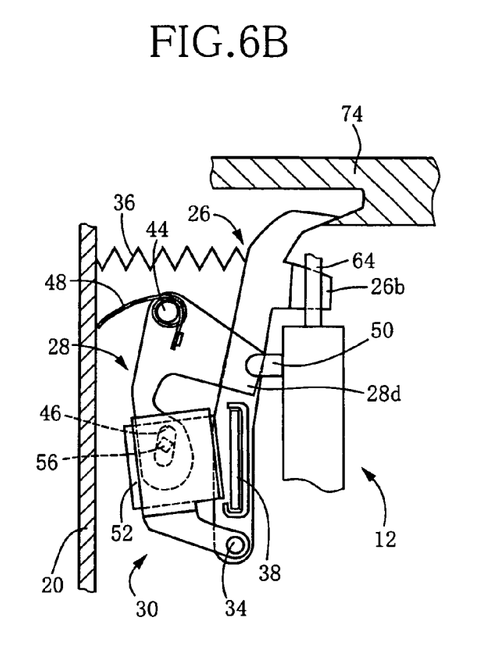
FIG. 6B is an elevational view partly in cross section for explaining an operation of the vehicular shift lock device when the shift lever is placed in its locked state.

When the shift lever 12 is pivoted about the second axis $O_2$ in the select direction toward the right longitudinal wall 20 while the shift lock device 10 is placed in its initial state described above, the pusher pin 50 comes into abutting contact with the cam surface 28*d* of the cam link 28, so that the cam link 28 is pivoted clockwise about the second support shaft 44, from the original position of FIG. 6B to its operated position of FIG. 6A. Since the cam link 28 and the solenoid link 30 are operatively connected to each other through the engagement of the pin 56 with the elongate hole 46, the counterclockwise pivotal movement of the cam link 28 causes a counterclockwise movement of the solenoid link 30 about the first support shaft 34.

If the solenoid 52 is in the energized state when the solenoid link 30 is pivoted counterclockwise, the yoke 38 is attracted to the solenoid 52, so that the lock lever 26 is pivoted counterclockwise about the first support shaft 34 against the biasing force of the return spring 36, during the counterclockwise pivotal movement of the solenoid link 30, as shown in FIG. 6A. Thus, the lock lever 26 is pivoted from its locking position to its unlocking position as the shift lever 12 is pivoted from the PARKING position P in the select direction while the solenoid 52 is placed in the energized state. In the unlocking position of the lock lever 26 established by the pivotal movement of the shift lever 12 in the select direction, the abutting portion 26b of the lock lever 26 does not interfere with the path of rightward movement of the shift lever 12 (rod 64) from the PARKING position P, and permits the rightward movement of the shift lever 12. A magnetic force which is generated by the solenoid 52 and by which the yoke 38 is attracted to the solenoid 52 is determined based on the biasing force of the return spring 36, so as to be larger enough to prevent removal of the yoke 38 from the solenoid 52 due to the biasing force of the return spring 36.

If the solenoid 52 is in the de-energized state when the solenoid link 30 is pivoted counterclockwise with the clockwise pivotal movement of the cam link 28, the lock lever 26 remains in its locking position (initial state of FIG. 5A and FIG. 6B), so that the shift lever 12 comes into abutting contact with the abutting portion 26b of the lock lever 26 during the pivotal movement of the shift lever 12 from the PARKING position P, whereby the shift lever 12 is prevented from being further pivoted.

In the vehicular shift lock device 10 constructed according to the present embodiment of the invention, the shift lock member in the form of the lock lever 26 is disposed pivotally about the axis of the first support shaft 34, such that the abutting portion 26b of the lock lever 26 is movable in the longitudinal direction of the vehicle which intersects the path of movement of the shift lever 12 in the transverse direction of the vehicle. The locking position of the lock lever 26 is defined or determined by the guide plate 74 having the guide slot 72 defining the paths of movement of the shift lever 12 in the longitudinal and transverse directions. Accordingly, the position of abutting contact between the shift lever 12 guided by the guide plate 74 and the shift lock member 16 placed in the locking position defined by the guide plate 74 is less likely to vary due to a positioning error of the guide plate 74 relative to the base member 14. Thus, the lock lever 26 can be small-sized and made compact in construction and assures a high degree of its locking function, and is economical to manufacture in the absence of a need for high accuracy of positioning of the guide plate 74 relative to the base member 14.

The lock lever 26 is held in its locking position with its engaging jaw 26a held in engagement with the engaging portion 78, at a position lying on the straight line L passing the axis of the first support shaft 35 and the abutting portion 26b. The engaging jaw 26a and the engaging portion 78 have the mutually contacting straight surfaces which are inclined with respect to the straight line normal to the circular arc having its center on the axis of the first support shaft 34. Accordingly, the component $f_{3a}$ of the reaction force $f_3$ produced upon the pressing contact of the engaging jaw 26a with the engaging portion 78 acts on the lock lever 26 in the radially outward direction of the above-indicated circular arc, so that the load $f_2$ acting between the lock lever 26 and the first support shaft 34 is reduced by an amount equal to the component force $f_{3a}$, which acts in the direction (radially outward direction) opposite to the direction (radially inward direction) in which the component $f_{1a}$ of the load $f_1$ acts on the lock lever 26 as a result of the abutting contact of the shift lever 12 with the abutting portion 26b. Namely, the load $f_{1a}$ acts on the lock lever 26 in one of the opposite directions of extension of the straight line L, while the load $f_{3a}$ acts on the lock lever 26 in the other of the opposite directions of extension of the straight line L. Owing to the thus reduced load $f_2$, the lock lever 26 and the first support shaft 34 can be further small-sized and made more compact in construction and is more economical to manufacture. In the present embodiment, the abutting portion 26b on which the load $f_{1a}$ acts, and the engaging jaw 26a on which the load $f_{3a}$ acts are located relatively close to each other, whereby deformation of the lock lever 26 is prevented or minimized, making it possible to further reduce the size and weight of the lock lever 26 while assuring a high degree of its durability.

It is to be understood that the preferred embodiment of the present invention has been described above by reference to the accompanying drawings, for illustrative purpose only, and that the present invention may be embodied with various changes, modifications and improvement, which may occur to those skilled in the art.

What is claimed is:

1. A vehicular shift lock device comprising:
   a shift lock member that moves between a locking position which is located on a predetermined path of movement of a shift lever from one operating position to another operating position and in which the shift lock member inhibits said movement of the shift lever, and an unlocking position which is spaced from said locking position and in which the shift lock member permits said movement of the shift lever; and
   a guide member which guides said shift lever so as to move along said predetermined path of movement,
   wherein said guide member defines said locking position of said shift lock member when said shift lock member is moved in a direction intersecting said predetermined path of movement of said shift lever, such that the shift lock member and the guide member are held in pressing contact when the shift lock member is in the locking position, and
   wherein the shift lock member includes an abutting portion which is movable in the direction intersecting said predetermined path of movement of the shift lever and makes abutting contact with the shift lever to inhibit the movement of the shift lever when the shift lock member is in the locking position.

2. The vehicular shift lock device according to claim 1,
   wherein said shift lock member is pivotally disposed about an axis of a support shaft,
   wherein said shift lock member and said guide member are arranged such that a first load acts on said shift lock member in a direction toward said axis of said support shaft along a first line between the axis of the support shaft and a point of engagement of the shift lock member and the guide member, as a result of the abutting contact of said shift lever with said abutting portion while said shift lock member is in said locking position,
   wherein when said shift lock member is placed in said locking position, the pressing contact of said shift lock member and said guide member is at a position lying on or close to said first line, and at least one of mutually contacting surfaces of said shift lock member and said guide member is inclined with respect to a second line that is a straight line normal to a circular arc that is centered on said axis of said support shaft, and
   wherein a second load acts on said shift lock member in a direction away from said axis of said support shaft along the first line as a result of said pressing contact while said shift lock member is in said locking position.

3. The vehicular shift lock device according to claim 2, wherein both of said mutually contacting surfaces of said shift lock member and said guide member are parallel to each other and inclined with respect to said second line.

4. The vehicular shift lock device according to claim 2, wherein a position of said pressing contact of said shift lock member with said guide member is located in an area defined by two boundary straight lines which are inclined with respect to a reference straight line which is said first line, and
   wherein said two boundary straight lines are inclined by a maximum angle of 20° on respective opposite sides of said reference line.

5. The vehicular shift lock device according to claim 4, wherein said two boundary straight lines are inclined by a maximum angle of 10° on respective opposite sides of said reference line.

6. The vehicular shift lock device according to claim 2, wherein said guide member includes an engaging portion, and said shift lock member is a lock lever which is pivotable about the axis of said support shaft extending in a substantially horizontal direction substantially parallel to a transverse direction of a vehicle, said lock lever generally extends in a substantially vertical direction and including an engaging jaw which is formed in an upper end portion thereof and engageable with said engaging portion of said guide member for holding said lock lever in said locking position.

7. The vehicular shift lock device according to claim 6, wherein said shift lever is disposed pivotably about an axis of a select shaft extending in a substantially horizontal direction substantially parallel to a longitudinal direction of the vehicle, such that said shift lever comes into abutting contact with said abutting portion of said lock lever placed in said locking position when said shift lever is pivoted about the axis of said select shaft.

8. The vehicular shift lock device according to claim 7, wherein the mutually contacting parallel surfaces of said the engaging jaw of said shift lock member and said engaging portion of said guide member are inclined with respect to said second line such that the mutually contacting surfaces extend in a rearward direction of the vehicle as the mutually contacting surfaces extend in a radially outward direction of said circular arc.

9. The vehicular shift lock device according to claim 1, further comprising:
   a solenoid link that is pivotally arranged about a first support shaft and includes a solenoid, a holder casing, and a pin,
   wherein the shift lock member includes a bracket portion disposed between the first support shaft and the abutting portion that holds a yoke that includes a ferrous material,
   wherein an end portion of the solenoid extends from the solenoid holder and attracts the yoke when the solenoid is in an energized state, and
   wherein the shift lock member and the solenoid link pivot together about the first support shaft when the solenoid is in the energized state.

10. The vehicular shift lock device according to claim 9, further comprising:
    a cam link that is pivotally mounted about a second support shaft and includes a vertical portion that extends in a vertical direction and a horizontal portion that extends in a horizontal direction,
    wherein the vertical portion includes an elongated hole through the cam link such that the pin of the solenoid link extends through the elongated hole,
    wherein the horizontal portion includes a cam surface that contacts a pusher pin of the shift lever at an area of the cam surface that is below an axis of the second support shaft in the vertical direction.

11. The vehicular shift lock device according to claim 1, further comprising:
    a base member to which the shift lever and the shift lock member is mounted,
    wherein the guide member is fixed to the base member.

\* \* \* \* \*